April 3, 1962 M. J. HAMMER 3,028,115
SPINNING REEL
Filed Sept. 17, 1958 2 Sheets-Sheet 2
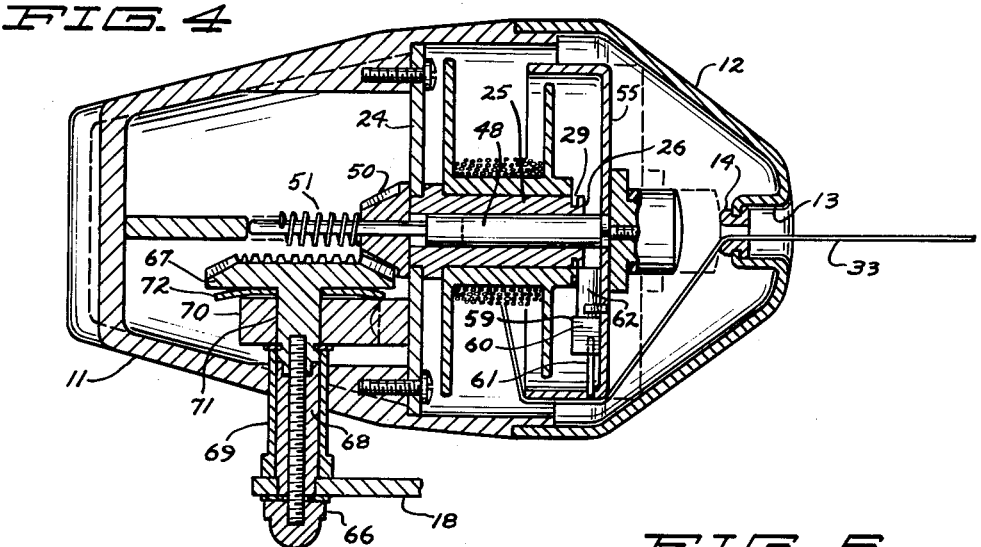
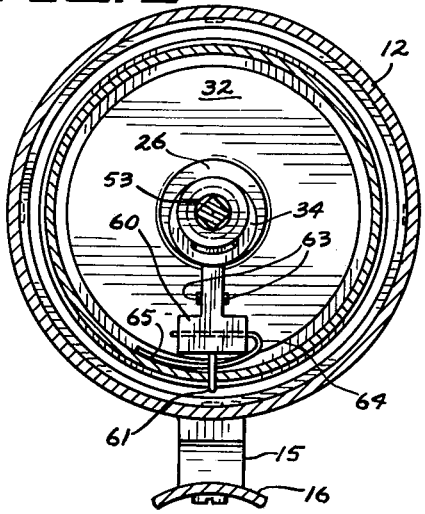
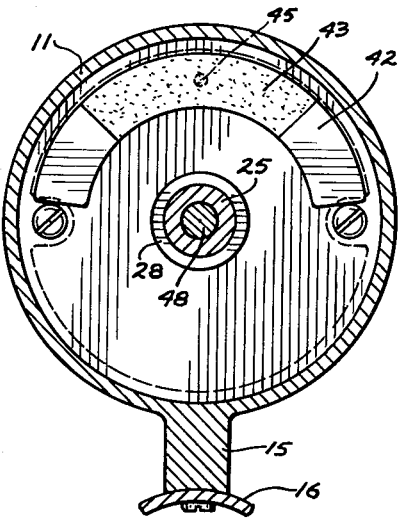
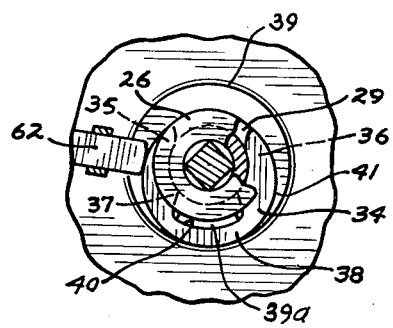
INVENTOR.
MAURICE J. HAMMER
BY
ATTORNEY United States Patent Office 3,028,115
Patented Apr. 3, 1962

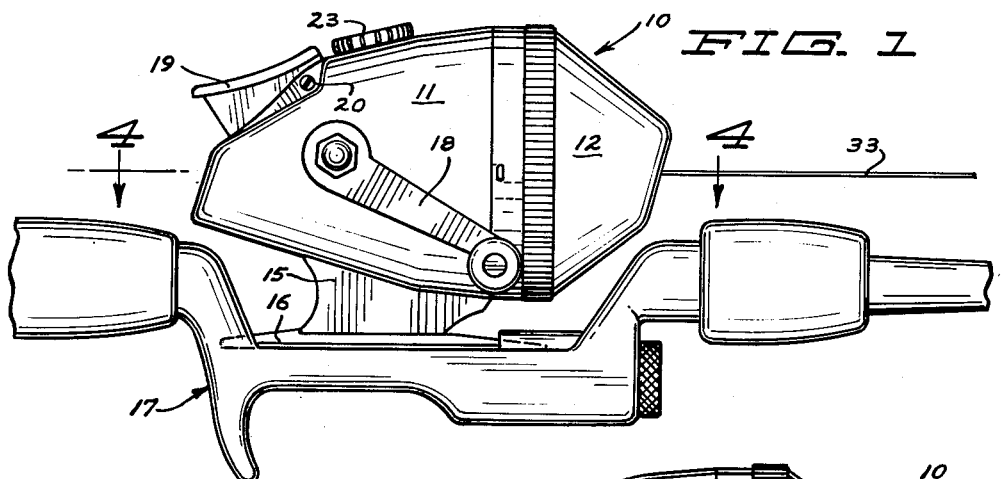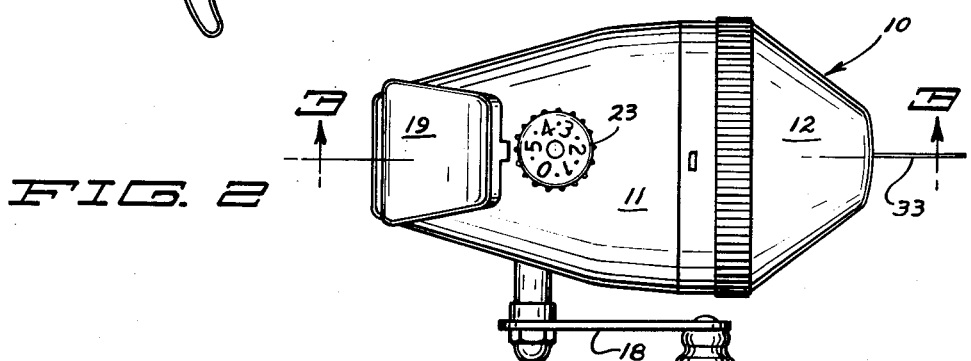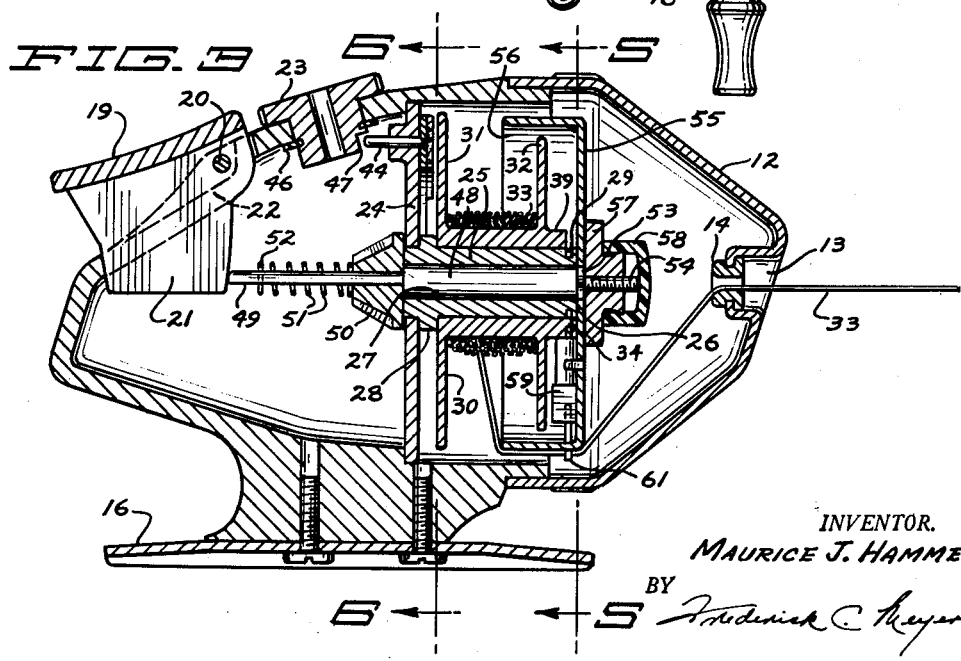

1

3,028,115
SPINNING REEL
Maurice J. Hammer, Lexington, Mich., assignor to Great Lakes Products, Inc., Lexington, Mich., a corporation of Michigan
Filed Sept. 17, 1958, Ser. No. 761,600
4 Claims. (Cl. 242—84.2)

This invention relates to fishing reels, and more particularly to spinning reels wherein the line is cast and retrieved axially of the spool.

It is an important object of the present invention to provide an improved reel construction which will have relatively few parts and will be not only economical and efficient in use but will be easily manufactured and serviced.

Another object of the invention is to provide a spinning reel wherein the spool element can be quickly and easily interchanged so that lines of different character can be used consecutively in the reel without requiring rewinding thereof prior to use and without regard to the direction in which the line is wound upon the spool, the reel being adaptable to rotation in either direction.

A further object of the invention is to provide a spinning reel of the class described wherein a special spring clip is utilized to perform a dual function in removably retaining a line spool against endwise displacement and in providing cam action for retraction of a line pick-up means.

These and other objects and advantages of the invention will more fully appear from the following description, made in connection with the accompanying drawings, wherein like reference characters refer to the same parts throughout the several views and in which:

FIGURE 1 is a side elevation of my spinning reel being operably mounted upon the handle portion of a fishing rod;

FIGURE 2 is a top view of the reel;

FIGURE 3 is an enlarged vertical section taken on the line 3—3 of FIGURE 2, and with the flyer in retracted position and the pick-up pin in extended condition;

FIGURE 4 is an enlarged horizontal section taken on the line 4—4 of FIGURE 1, the flyer being extended to line-casting position and the dotted line configuration showing the position of the flyer for snubbing the fishline;

FIGURE 5 is a vertical section taken on the line 5—5 of FIGURE 3;

FIGURE 6 is another vertical section taken on the line 6—6 of FIGURE 3; and

FIGURE 7 is a further enlarged view of the spring clip member retaining the spool in place and showing the camming action upon the pick-up pin.

With continued reference to the drawings, and particularly to FIG. 1, my spinning reel is designated generally as 10 and has a hollow case or housing 11 provided at its forward end with a cap or cover 12 detachably secured thereto. The cap 12 is, in turn, provided with a line guide 13 having an inwardly extending grommeted opening 14, as more clearly illustrated in FIG. 4. The housing 11 is provided with a bracket 15 terminating outwardly in a reel seat 16 which is adapted to be retained in a conventional fishing rod handle 17 as shown in FIG. 1. Also secured with respect to the housing 11 are the rotatable handle 18, thumb button 19, pivotally mounted at 20 and having a bearing portion 21 depressible through slotted opening 22 through housing 11 and an adjustment button 23 rotatably mounted at the top of the reel, as shown in FIGS. 1, 2 and 3. The coopera-

2 tive function of these elements will be discussed at greater length later in this specification.

Referring now to FIG. 3, a transverse plate 24 is rigidly secured within the hollow housing 11 and is provided with a rigid spool post 25 which terminates in a forwardly directed free end 26 and is further provided with a longitudinal bore 27 extending throughout the length of the post and through the transverse plate 24, as shown. The spool post 25 is further provided with an annular flange 28 adjacent the transverse plate 24 and with an annular groove 29, as shown in FIGS. 3, 4 and 7.

The spool post has mounted thereon a spool 30 which is provided with a rear flange 31 and a smaller forward flange 32 and spaced therefrom to receive windings of fishline 33. The spool 30 is frictionally rotatable on spool post 25 and is removably retained in position thereon by means of retaining member 34 which, in turn, is fastened with respect to groove 29 and forms an important part of the invention herein disclosed. The retaining member 34 may be in the form of a spring clip, as shown in detail in FIG. 7. Spring clip 34 is provided with a C-shaped structure wherein the ends 35 and 36 are sprung slightly apart when the clip is inserted into groove 29 and frictionally retain the clip with an inner portion 37 lying within the groove 29 and an eccentric area 38 lying without the groove 29. The eccentric outer portion 38 bears against the forward or hub portion 39 of spool 30 to prevent displacement of the spool until the spring clip is removed therefrom. The spring clip may be provided with a cut-out or recessed area 40 in the outer exposed portion 38 for engaging raised abutment 39a on hub portion 39 and for insertion of a tool such as a screwdriver to assist in the simple removal of the clip for replacing spool elements 30 as the operator may desire. The outer circumference 41 of the spring clip 34 provides a camming surface, the purpose of which will be disclosed and discussed more fully subsequently.

In order to vary the frictional resistance to the rotation of spool 30, I provide a brake shoe 42 which is arcuate in shape and is provided with a friction surface 43 adapted to contact the rear flange 31 and frictionally restrain the spool 30 from rotation in accordance with the pressure of the surface 43 upon flange 31. In order to adjust the pressure of the brake shoe, I employ a longitudinally slidable pin 44 mounted within and through the transverse plate 24 and in engagement with a dimple or depression 45 at the rear face of the brake shoe 42, as shown in FIGS. 3 and 6. The adjustment button 23 is rotatably mounted in the housing 11, being secured thereto by clip 46 as shown in FIG. 3. Button 23 has an eccentric inner portion 47 which bears against the pin 44 causing it to extend through transverse plate 24 for exerting forward pressure upon the brake shoe 42 in accordance with the adjusted position of the button 23.

Within the longitudinal bore 27 of the spool post 25 lies a spindle 48 which is both rotatable and axially slidable within bore 27. The spindle 48 terminates rearwardly in an elongated portion 49 having a non-circular cross section and slidably received axially of a beveled gear 50. A compression spring 51 is interposed between an abutment 52 and the beveled gear 50 so as to constantly urge the spindle 48 rearwardly to the position shown in FIG. 3. Since the rear extension 49 is non-circular, the spindle 48 will always rotate with beveled gear 50 irrespective of its axial position relative thereto. The thumb button 19 is so aligned with the rear extension 49 of spindle 48 that the inwardly extending bearing portion 21 will lie in endwise contact therewith and, upon pivotal depression of the thumb button 19, will cause forward axial movement of the entire spindle 48.

At the forward end of spindle 48 lies a narrow squared shank 53 and a reduced threaded end 54 in forwardly terminating relation therewith. A circular flyer 55 having a rearwardly extending circumferential flange 56 is mounted rigidly with respect to the spindle, the flyer being mounted axially upon the square shank 53. The flyer is retained in its position on spindle 48 by means of a nut 57 threadedly secured to the forward reduced portion 54 of the spindle 48. A snubbing abutment 58 is mounted upon the nut 57 and lies forwardly thereof so as to engage the grommeted line guide 14 when the thumb button 19 is depressed to its fullest extent. Line 33 will thus be snubbed where it passes through line guide 13 and prevented from travelling therethrough until pressure is released on thumb button 19.

The flyer 55 is provided with line pick-up means 59 which is extendible to engage line 33 and retractable to permit the line to play out over the circumference 56 of flyer 55, as desired by the operator. The pick-up means 59 may be simply constructed of a block 60 of material such as nylon having a radial pin 61 embedded therein and projecting outwardly therefrom. The inwardly extending portion 62 of block 60 is adapted to slide between the guides 63 as shown in FIG. 5. A simple spring wire 64 may also be embedded within the body 60 and have an outward extension 65 which resiliently bears against the inner surface of flange 56 to normally retract the body 60 as well as radial pin 61. Pin 61 extends through the flange 56 and is of such a length that, when fully retracted, will lie flush or slightly recessed with respect to the flange 56 of flyer 55, as shown in FIG. 4, and will extend radially outward for engaging line 33 when in its extended line pick-up position, as shown in FIG. 3.

In order to rotate the spindle 48 and the flyer 55, the outwardly extending handle 18 is secured by fastening means 66 to drive bevel gear 67 which, in turn, meshes with the bevel gear 50. The shaft assemblage 68 secured to bevel gear 67 is journaled in a sleeve 69 in turn mounted at the side of housing 11 and bearing against a bracket bearing 70 which, in turn, is rigidly mounted to the rear of the transverse plate 24, as shown in FIG. 4. The hub 71 of bevel gear 67 is journaled in the bracket bearing 70, as shown. A conventional radially toothed spring washer 72 may be interposed between the bevel gear 67 and the bracket bearing 70 so as to prevent rotation of handle 18 in a reverse direction.

The operation of my spinning reel will be readily apparent by reference to the foregoing and will be briefly outlined herewith.

With the flyer 55 and spindle 48 in the retracted position shown in FIG. 3, handle 18 may be rotated in a clockwise direction to cause the flyer and pick-up pin 61 to retrieve line 33 through a line guide 13 and lay windings thereof upon the spool 30 in conventional manner. In the event tension is exerted upon 33 in excess of the friction exerted upon spool flange 31 by brake shoe 42 under adjustment of adjustment button 23, then the spool 30 will frictionally rotate on its spool post 25. If the frictional resistance is sufficient to prevent rotation of spool 30, then line 33 will continue to be wound upon the spool with rotation of handle 18. When it is desired to free the line 33 to permit it to play out from spool 30, the thumb button 19 is depressed so as to cause forward sliding movement of spindle 48 and the flyer 55 mounted thereon. As the flyer moves forwardly, the inner end 62 of the pick-up member 59 will drop from the spool hub 39 to its stopped position with the pin 61 fully retracted so as to permit pay-out of line 33 around the circumference 56 of flyer 55. Upon further depression of the thumb button 19, the abutment 58 will press against the grommeted portion 14 and snub the line 33. In casting, the line 33 may be snubbed until the moment of release whereupon the thumb is raised from thumb button 19 and the flyer will return to its partially extended position, as shown in FIG. 4. The pin 61 will remain retracted since the inner portion 62 of the pick-up means now lies forwardly of the spool hub 39 and in contact with the forward face thereof, as shown in FIG. 7. If the position of spool 30 is such that the exposed portion 38 of spring clip 34 underlies the inner extension 62, then the pin will rest for the time being against the spring clip 34 itself. When it is desired to retrieve line 33, the handle 18 is rotated in a clockwise direction as viewed in FIG. 1 and relative rotation will take place between the flyer 55 and the spool 30. The spring clip 34 is secured with respect to the spool 30 and, hence, the pick-up means 59 will slide off the exposed portion 38 of spring clip 34 and momentarily lie against the forward face of hub 39 under the influence of spring 51 which pulls the spindle and flyer rearwardly. On further rotation of the flyer, the inwardly extending portion 62 will ride upon the outer cam surface 41 of spring clip 34 and will climb to the outermost eccentric portion which is in registry with the outer circumference of hub 39. When this portion of the relative rotation between the flyer and spool has been reached, then the pick-up means will slide rearwardly to again ride upon the spool hub 39 with the flyer 55 fully retracted. As long as the pick-up means remains in the latter position, the pin 61 will be extended radially outward from the flange 56 and again in line pick-up position as illustrated in FIG. 3.

It may thus be seen that I have devised a simple fastener for releasably retaining a spool upon its mounting post while at the same time utilizing the retaining means as a camming element to control the extension and retraction of the pick-up pin.

It will, of course, be understood that various changes may be made in the form details, arrangements and proportions of the parts without departing from the scope of my invention as set forth in the appended claims.

What I claim is:

1. In a spinning reel of the type having a rotatable flyer with a pick-up pin radially extendible therefrom and normally biased to retracted position, a spool assembly which comprises, a rigid spool post terminating forwardly in a free end and having a central bore for journaling the rotatable flyer, a spool mounted for frictional rotation upon said spool post and adapted to receive windings of fishline from the flyer when said flyer is rotating with the pin extended, a groove formed circumferentially about the spool post adjacent the free end thereof, and a unitary and substantially flat retaining member having an inner portion riding within said groove and an outer portion bearing against said spool and thereby securing said spool against endwise displacement, said retaining member further having an outer exposed peripheral cam surface for engaging the pick-up pin and radially extending the same upon relative rotation between the flyer and the spool.

2. A spinning reel comprising, a housing having a transverse plate and a forward cap with a line guide formed therethrough, a spool post having a central bore and an external annular groove, said spool post being rigidly mounted on said transverse plate and terminating forwardly in a free end, a spool mounted for frictional rotation upon said spool post, a spindle mounted for rotation and axial sliding in said central bore, handle means operably connected to said spindle and extending externally of said housing for rotating the spindle, line pick-up means carried by the spindle forwardly of said spool and being extendible to a position for engaging and winding a fishline upon the spool, a single substantially flat retaining member bearing against said spool and being secured to said spool post in said annular groove whereby relative rotational movement of the spool can be effected and axial movement thereof prevented, said retaining member having a peripheral cam surface which is engaged with said pick-up means when the spindle is in an axially retracted position to extend said pick-up means into line pick-up position.

3. The combination of claim 2 including a thumb button means for moving said spindle axially to disengage said pick-up means from said cam surface to allow retraction of said pick-up means to free said line for casting.

4. In a spinning reel of the type having a rotatable flyer with a pick-up pin radially extendible therefrom and normally biased to retracted position, a spool assembly which comprises, a rigid spool post terminating forwardly in a free end and having a central bore for journaling the rotatable flyer, a spool mounted for frictional rotation upon said spool post and adapted to receive windings of fishline from the flyer when said flyer is rotating with the pin extended, a groove formed circumferentially about the spool post adjacent the free end thereof, and a unitary and substantially flat C-shaped spring clip resiliently engaging said groove and removable therefrom to permit the spool to be removed from said spool post, said spring clip having an inner portion riding within said groove and an outer portion bearing against said spool and thereby securing said spool against endwise displacement, said spring clip also having an outer exposed peripheral cam surface for engaging the pick-up pin and radially extending the same upon relative rotation between the flyer and the spool.

References Cited in the file of this patent
UNITED STATES PATENTS

| | | |
|---|---|---|
| 2,630,979 | Uerling | Mar. 10, 1953 |
| 2,828,088 | Denison et al. | Mar. 25, 1958 |
| 2,828,927 | Yeada | Apr. 1, 1958 |